A. REED.
AUXILIARY WINDSHIELD.
APPLICATION FILED DEC. 23, 1919.
1,391,580. Patented Sept. 20, 1921.
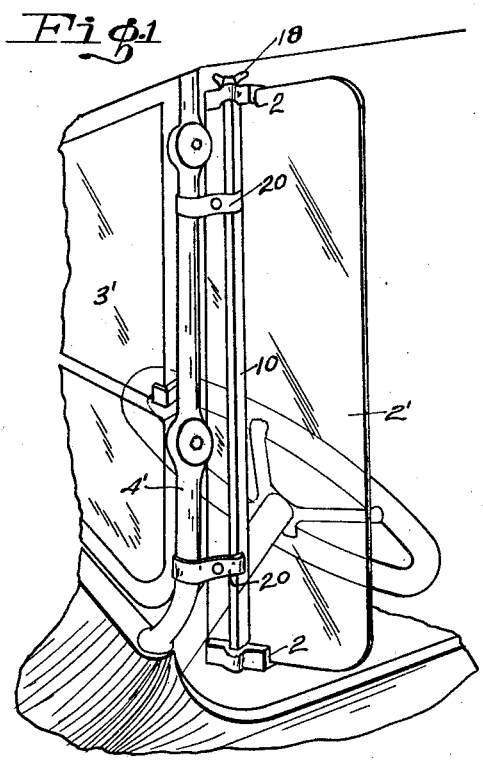
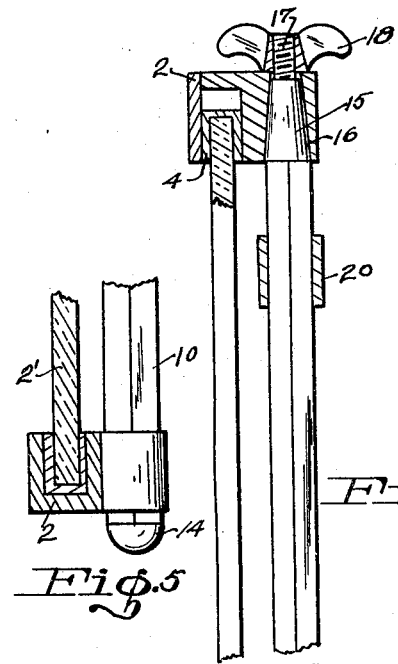
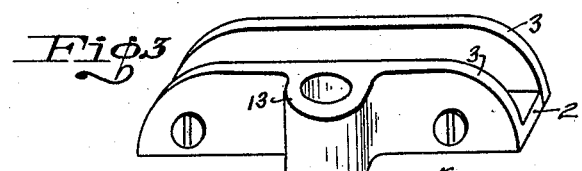
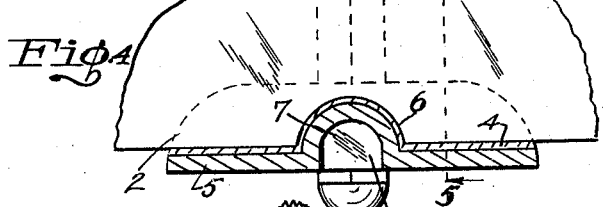
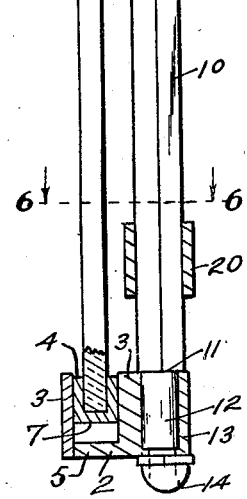
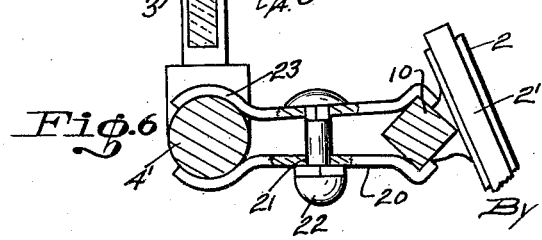
INVENTOR
Asbury Reed
By Hazard & Miller
Att'ys

UNITED STATES PATENT OFFICE.

ASBURY REED, OF LOS ANGELES, CALIFORNIA.

AUXILIARY WINDSHIELD.

1,391,580.  Specification of Letters Patent.  Patented Sept. 20, 1921.

Application filed December 23, 1919.  Serial No. 346,963.

*To all whom it may concern:*

Be it known that I, ASBURY REED, a citizen of the United States, residing at Los Angeles, in the county of Los Angeles and State of California, have invented new and useful Improvements in Auxiliary Windshields, of which the following is a specification.

This invention relates to auxiliary windshields and has for its object to provide a supplementary auxiliary windshield of inexpensive construction, neat and attractive appearance, and in which the parts are small and easily replaced and assembled and which will permit the maximum efficiency in observation through the windshield by the elimination of bulky elements such as would obstruct the vision from the interior of the vehicle on which the device might be applied.

The invention consists of the construction, combination and details, an embodiment of which is illustrated in the accompanying drawings, and described and claimed hereinafter.

Figure 1 is a perspective of the front portion of a windshield partly broken away and showing the auxiliary windshield attached to the main support.

Fig. 2 is an end elevation, partly in section, of the windshield.

Fig. 3 is a perspective of one of the bearing members for the plate.

Fig. 4 is a longitudinal section through one of the bearing members.

Fig. 5 is a transverse section on the line 5—5 of Fig. 4.

Fig. 6 is a transverse section through the supporting device on line 6—6 of Fig. 2.

One of the important features of the present invention resides in the means for securely fastening an auxiliary wind-shield in the form of a sheet of plate glass 2' so that it can be securely held in any desirable angular position with relation to the usual main or front windshield 3' of an automobile, this windshield usually being formed of sections that are pivotally mounted on an upright standard or supporting post 4'.

In the preferred embodiment of the invention the upper and lower transverse edges of the plate glass 2' are adapted to be embraced at suitable positions by small bearing members, clearly illustrated in Fig. 3, the member comprising essentially a channel-like socket part 2 having parallel side flanges or walls 3—3 of sufficient width to receive the inserted plate of glass and also a strip of suitable backing material, as felt, rubber, or other cushioning material, indicated at 4 in Fig. 2.

The longitudinal bottom or web 5 of the clamp or bearing member 2 is preferably provided with a transverse bridge or locking means designed to fit into a complementary recess or notch 6 formed in the edge of the glass to which the clamp or bearing member 2 is to be applied so as to prevent relative shifting movement of the clamp member 2 on the edge of the plate. As shown in Figs. 2 and 4, this interlocking part may be formed integrally as in the form of an arch or bow 7 projecting inwardly between the walls 3—3 and to enter the recess or notch 6, it being understood that the backing material 4 also straddles or passes over the locking shoulder 7 so as to form a cushion seat for the edge of the glass. It is understood, however, that the locking shoulder or part 7 may be integral or otherwise, as desired, and when it is integrally formed the body of the lug 7 is preferably hollowed out or concave as at 8 for the purpose of economizing in material and reducing the weight of the clamp or bearing member 2. These clamps being applied in reversed relative positions to the opposite ends of the plate 2, are adapted to be drawn snugly in supporting position as by means of a single tie or connecting rod 10, Figs. 1 and 2, that may be of polygonal or other suitable cross section, one end of which is provided with a shoulder 11 and a reduced stem 12 passing through a socket or sleeve 13 formed on one side of the bearing member 2, and the lower end of the reduced stem 12 is shown as threaded to receive a cap nut 14 by which the exposed end of the rod may be covered and by it is clamped to its socket part 13. The upper or opposite end of the rod 10 is shown as turned to conical or tapering form as at 15 to fit the complementary conical seat or socket 16 of the upper bearing member or clamp 2, and the conical end 15 of the tie rod 10 is reduced and threaded as at 17 and extends beyond the socket 16 to receive a wing or other suitable nut 18, which, when applied to the threaded end and turned down into abutment with the adjacent socket 16 serves not only to draw the conical end 15 tightly into its seat and also relatively contract the upper and the lower bearing members 2—2, but further serves to lock the rod 10 against turning movement in the bearing or socket 16. This is for the purpose of maintaining the windshield plate 2' in desired angular adjustment with respect to the rod 10 and to the adjacent front or main windshield 3'. The rod 10 is preferably formed of polygonal cross section and may be square, as shown, so as to take the complementary ends of a pair of clamp leaves 20, Fig. 6, the intermediate parts of which are perforated as at 21 to receive a clamping bolt 22. The opposite ends of the clamping leaves 20 are bowed or otherwise suitably formed to provide jaws 23 readily applicable to securely clamp upon the interposed standard or upright 4' to which it is desired to attach the auxiliary windshield.

From the above it will be seen that it is possible to swing the windshield plate 2' about the axis of the rod 10 by loosening the fastening nut 18 and turning the bearings 2—2 about the rod while the latter is held in its given position by the clamp leaves 20 on the standard form, or, it may sometimes be desirable to turn the clamp leaves 20 about the standard 4' and this can be done by releasing the clamping bolts 22 to permit the clamp leaves 20 to be swung with the windshield 2'.

Various changes may be made without departing from the spirit of my invention as claimed.

I claim:

A windshield comprising a glass plate having notches in its upper and lower edges, upper and lower bearing members having channels for the reception of the upper and lower edges of the glass plate, transverse stop parts located in the base of the channels adapted to enter the notches of the plate for holding it against endwise movement, said members each having a socket and the socket of the upper member being tapered, a rod received in the socket of the lower member, and having an end thereof tapered adapted to be received in the tapered socket of the upper member, and means for drawing the rod into the tapered socket and causing the bearing members to clamp the glass plate therebetween.

In testimony whereof I have signed my name to this specification.

ASBURY REED.